United States Patent
Hong et al.

(10) Patent No.: US 7,238,225 B2
(45) Date of Patent: Jul. 3, 2007

(54) PLASMA AIR DUST COLLECTOR

(75) Inventors: Young-Ki Hong, Gimhae (KR);
Sung-Hwa Lee, Changwon (KR);
Jeong-Ho Park, Busan (KR)

(73) Assignee: LG Electronics Inc., Seoul (KR)

( * ) Notice: Subject to any disclaimer, the term of this patent is extended or adjusted under 35 U.S.C. 154(b) by 19 days.

(21) Appl. No.: 10/541,030

(22) PCT Filed: Dec. 8, 2003

(86) PCT No.: PCT/KR03/02684

§ 371 (c)(1),
(2), (4) Date: Jun. 28, 2005

(87) PCT Pub. No.: WO2004/060410

PCT Pub. Date: Jul. 22, 2004

(65) Prior Publication Data

US 2006/0070526 A1 Apr. 6, 2006

(30) Foreign Application Priority Data

Jan. 7, 2003 (KR) ...................... 10-2003-0000785

(51) Int. Cl.
*B03C 3/47* (2006.01)

(52) U.S. Cl. .................. 96/69; 96/86; 96/87; 96/88; 96/96; 96/98

(58) Field of Classification Search ............ 96/69, 96/83, 84, 87, 88, 96, 98, 100, 86
See application file for complete search history.

(56) References Cited

U.S. PATENT DOCUMENTS

| 5,290,343 | A | * | 3/1994 | Morita et al. | 96/39 |
| 5,665,147 | A | * | 9/1997 | Taylor et al. | 96/72 |
| 5,759,240 | A | * | 6/1998 | Becker | 96/86 |
| 5,922,111 | A | * | 7/1999 | Omi et al. | 96/60 |
| 5,993,521 | A | * | 11/1999 | Loreth et al. | 96/69 |
| 6,164,082 | A | * | 12/2000 | Okamoto et al. | 62/317 |
| 6,579,349 | B1 | * | 6/2003 | Ting et al. | 96/44 |
| 2004/0182243 | A1 | * | 9/2004 | Loreth | 96/83 |

FOREIGN PATENT DOCUMENTS

| JP | 03 030847 A | | 2/1991 | |
| JP | 4-310251 | * | 11/1992 | 96/88 |
| JP | 4-363157 | * | 12/1992 | 96/96 |
| JP | 5-285421 | * | 11/1993 | 96/98 |
| JP | 09 313855 A | | 12/1997 | |
| JP | 2001 276649 A | | 10/2001 | |

\* cited by examiner

*Primary Examiner*—Richard L. Chiesa
(74) *Attorney, Agent, or Firm*—Birch, Stewart, Kolasch & Birch, LLP

(57) ABSTRACT

In a plasma air dust collector, the plasma air dust collector includes a first electrode fixing unit and a second electrode fixing unit respectively having a power terminal; at least two dust collecting electrodes; a discharge electrode arranged between the dust collecting electrodes; a terminal protrusion formed at the bottom end of each dust collecting electrode in the length direction; a terminal protrusion insertion hole formed at a side of the first electrode fixing unit; a combining protrusion formed at a side of the first electrode fixing unit and the second electrode fixing unit; and a combining groove formed at the both ends of each dust collecting electrode.

14 Claims, 10 Drawing Sheets

PLASMA AIR DUST COLLECTOR

TECHNICAL FIELD

The present invention relates to a plasma air dust collector, and in particular to a plasma air dust collector installed inside an air conditioner to purify indoor air by collecting dust in air sucked into the air conditioner.

BACKGROUND ART

In general, an air conditioner is divided into an indoor unit and an outdoor unit, the indoor unit is installed indoors, the outdoor unit is installed outdoors, and the indoor unit and the outdoor unit are connected with each other through pipes and wiring.

FIG. 1 is a longitudinal-sectional view illustrating an indoor unit of a general panel type air conditioner.

As depicted in FIG. 1, the indoor unit of the general panel type air conditioner includes a casing 3 having a suction hole 1 at the top and a discharge hole 2 at the bottom; a heat exchanger 4 installed in the casing 3; a fan 5 installed at the rear of the heat exchanger 4; and a plasma air dust collector 10 installed at the front of the heat exchanger 4.

In the indoor unit of the general panel type air conditioner, warm air in a room is sucked into the casing 3 through the suction hole 1 by the operation of the fan 5, the sucked warm air is heat-exchanged into cool air and is discharged to the outside of the casing 3.

Herein, before the sucked warm air reaches to the heat exchanger 4, the air dust collector 10 purifies air by collecting dust in the sucked warm air in order to provide fresh air into the room.

FIG. 2 is an exploded-perspective view illustrating the conventional plasma air dust collector, and FIG. 3 is a combined-perspective view illustrating the conventional plasma air dust collector.

As depicted in FIGS. 2 and 3, the conventional air dust collector 10 includes a front casing 12 having plural paths 11 for passing air; a rear casing 14 having a certain internal space by being combined with the front casing 11 and having plural paths 13; each discharge electrode 15 arranged in the rear casing 14 in the length direction at regular intervals to generate discharge when a high voltage is applied; and each dust collecting electrode 16 arranged between the discharge electrodes 15 to collect dust when a high voltage is applied.

The operation of the conventional plasma air dust collector will be described.

As depicted in FIG. 5, when a high voltage is applied to the discharge electrode 15 and the dust collecting electrode 16, discharge plasma occurs between the discharge electrode 15 and the dust collecting electrode 16, dust particles passing between the dust collecting electrodes 16 are electrified by storing electric field and discharge plasma, and the electrified dust particles are collected on the dust collecting electrode 16 by the Coulomb's law.

However, in the compact structure or high performance aspect, the conventional plasma air dust collector has following problems.

First, because the discharge electrode 15 and the dust collecting electrode 16 are installed in the front and rear casings 12, 14, it is difficult to achieve a compact body.

Second, because the dust collecting electrode 16 is formed as a plate shape and dust collecting is performed on only the internal surface thereof dust collecting efficiency can not be improved.

TECHNICAL GIST OF THE PRESENT INVENTION

In order to solve the above-described problems, it is an object of the present invention to provide a compact plasma air dust collector by reducing a total volume.

It is another object of the present invention to provide a plasma air dust collector capable of improving dust collecting efficiency by increasing a dust collecting surface of a dust collecting electrode.

In order to achieve the above-mentioned objects, a plasma air dust collector in accordance with the present invention includes a first electrode fixing unit having a dust collecting electrode power terminal; a second electrode fixing unit arranged with a certain distance from the first electrode fixing unit to have a discharge electrode power terminal; at least two dust collecting electrodes as electric conductors installed between the first electrode fixing unit and the second electrode fixing unit in the length direction and connected to the dust collecting electrode power terminal in order to form an internal surface and a side surface thereof as dust collecting surfaces; and a discharge electrode as an electric conductor arranged between the dust collecting electrodes in the length direction and connected to the discharge electrode power terminal in order to apply a high voltage.

Each dust collecting electrode is connected to the first electrode fixing unit and the second electrode fixing unit as one body or detachably.

It is preferable for each dust collecting electrode to be formed as a bar shape having a rectangular section or a bar shape having a H-shaped section or a multiple shape having many sides.

Each dust collecting electrode is constructed with a body as an insulator and a conductive nickel gold-plate film covering the body.

In addition, a plasma air dust collector in accordance with the present invention includes a first electrode fixing unit having a dust collecting electrode power terminal; a second electrode fixing unit arranged with a certain distance from the first electrode fixing unit to have a discharge electrode power terminal; at least two dust collecting electrodes as electric conductors installed between the first electrode fixing unit and the second electrode fixing unit in the length direction and connected to the dust collecting electrode power terminal in order to form an internal surface and a side surface thereof as dust collecting surfaces; a discharge electrode as an electric conductor arranged between the dust collecting electrodes in the length direction and connected to the discharge electrode power terminal to apply a high voltage; and a dust collecting electrode combining means for combining the both ends of each dust collecting electrode respectively with the first electrode fixing unit and the second electrode fixing unit detachably.

The dust collecting electrode combining means includes a terminal protrusion formed at the bottom end of each dust collecting electrode in the length direction so as to be connected to the dust collecting electrode power terminal; a terminal protrusion insertion hole formed at a side of the first electrode fixing unit and the second electrode fixing unit so as to receive the terminal protrusion; a combining protrusion formed at a side of the first electrode fixing unit and the second electrode fixing unit; and a combining groove formed at the both ends of each dust collecting electrode so as to receive the combining protrusion.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, the preferred embodiments of the present invention will be described with reference to accompanying drawings.

Figure 6:
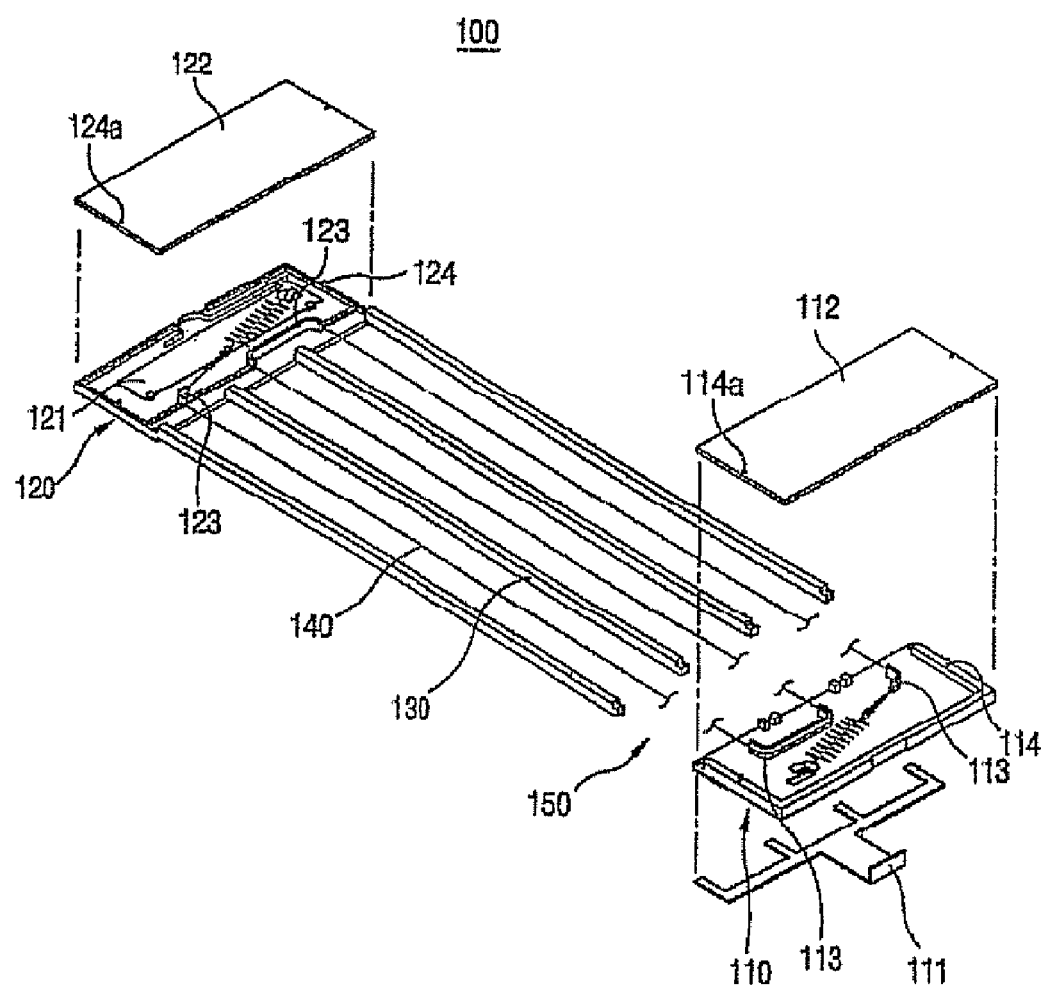
FIG. 6 is an exploded-perspective view illustrating a plasma air dust collector in accordance with the present invention.
Figure 7:
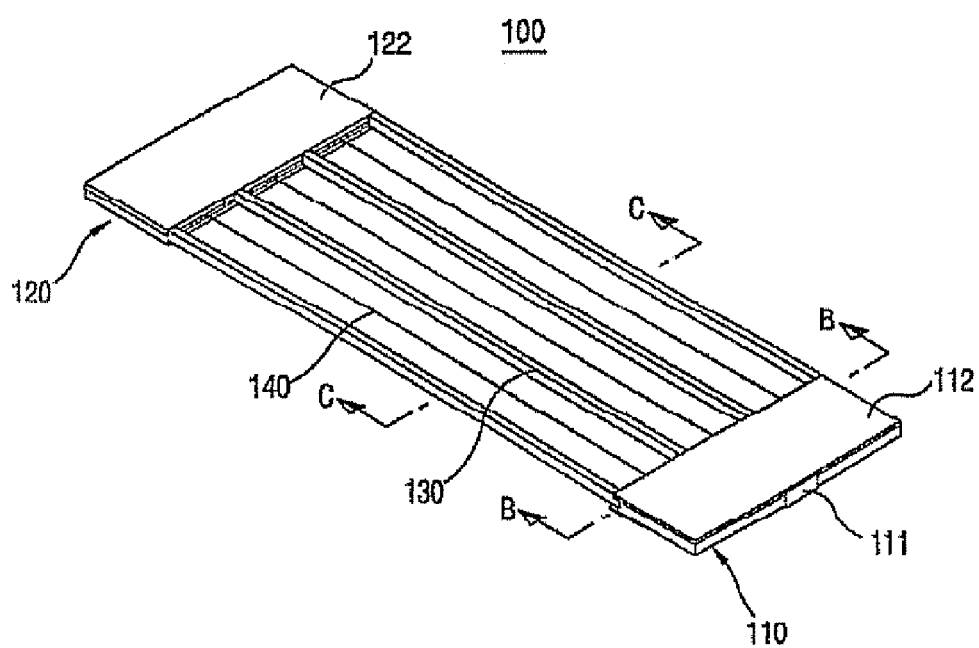
FIG. 7 is a combined-perspective view illustrating the plasma air dust collector in accordance with the present invention.
Figure 8:
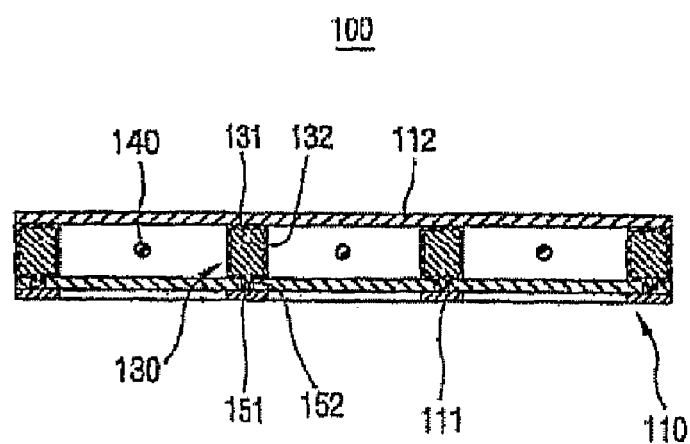
FIG. 8 is a sectional view taken along a line B—B in FIG. 7.
Figure 9:
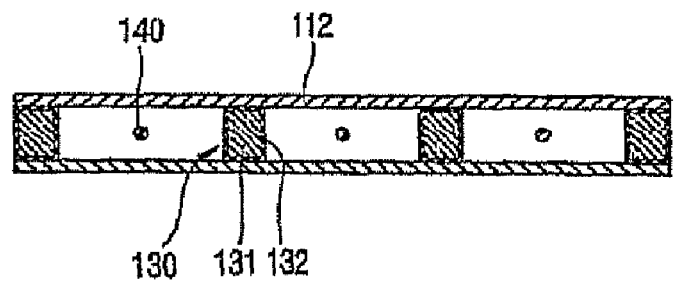
FIG. 9 is a sectional view taken along a line C—C in FIG. 7.
Figure 10:
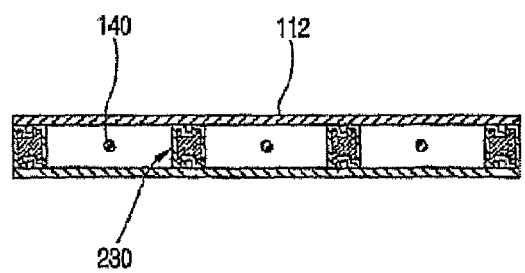
FIG. 10 is a longitudinal-sectional view illustrating another embodiment of a discharge electrode in the plasma air dust collector in accordance with the present invention.
Figure 11:
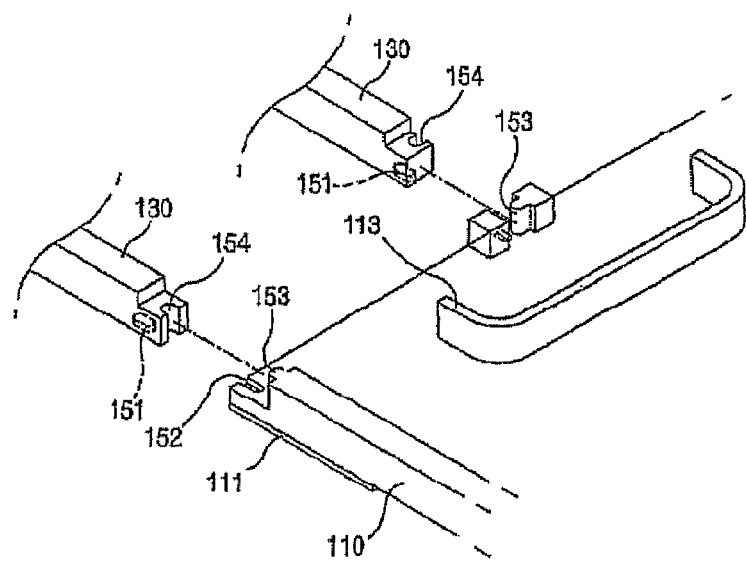
FIG. 11 is an exploded-perspective view illustrating a major part in FIG. 6.

FIG. 6 is an exploded-perspective view illustrating a plasma air dust collector in accordance with the present invention; FIG. 7 is a combined-perspective view illustrating the plasma air dust collector in accordance with the present invention; FIG. 8 is a sectional view taken along a line B—B in FIG. 7; FIG. 9 is a sectional view taken along a line C—C in FIG. 7; FIG. 10 is a longitudinal-sectional view illustrating another embodiment of a discharge electrode in the plasma air dust collector in accordance with the present invention; and FIG. 11 is an exploded-perspective view illustrating a major part in FIG. 6.

As depicted in FIGS. 6~11, the plasma air dust collector 100 in accordance with the present invention includes a first electrode fixing unit 110 having a dust collecting electrode power terminal 111; a second electrode fixing unit 120 arranged with a certain distance from the first electrode fixing unit 110 to have a discharge electrode power terminal 121; at least two dust collecting electrodes 130 as electric conductors installed between the first electrode fixing unit 110 and the second electrode fixing unit 120 in the length direction and connected to the dust collecting electrode power terminal 111 in order to form an internal surface 130a and a side surface 130b thereof as dust collecting surfaces; a discharge electrode 140 an electric conductor arranged between the dust collecting electrodes 130 in the length direction and connected to the discharge electrode power terminal 121 in order to apply a high voltage; and a dust collecting electrode combining means 150 for combining the both ends of each dust collecting electrode 130 respectively with the first electrode fixing unit 110 and the second electrode fixing unit 120 detachably.

The first electrode fixing unit 110 and the second electrode fixing unit 120 are respectively placed at the both sides of the plasma dust collector 100, and the first electrode fixing unit 110 and the second electrode fixing unit 120 are generally constructed as insulators.

The dust collecting electrode power terminal 111 is installed on the first electrode fixing unit 110, and the discharge electrode power terminal 121 is installed on the second electrode fixing unit 120.

The plasma air dust collector 100 is constructed so as to apply a high voltage to the dust collecting electrode power terminal 111 and the discharge electrode power terminal 121.

Each cover 112, 122 can be combined with the front surface (or the top surface) of the first electrode fixing unit 110 and the second electrode fixing unit 120. For that, a combining hook 114 can be formed at a side of the first electrode fixing unit 110, and a combining groove 114a can be formed at a side of the cover 112 so as to be corresponded to the combining hook 114. In addition, a combining hook 124 can be formed at a side of the second electrode fixing unit 120, and a combining groove 124a can be formed at a side of the cover 122 so as to be corresponded to the combining hook 124.

At least two dust collecting electrodes 130 are installed in the length direction between the first electrode fixing unit 110 and the second electrode fixing unit 120, the both ends of each dust collecting electrode 130 are respectively fixed to the first electrode fixing unit 110 and the second electrode fixing unit 120, and at the same time the both ends of each dust collecting electrode 130 are respectively contacted to the discharge electrode power terminal 121 and the dust collecting power terminal 111 by the dust collecting electrode combining means 150.

Each dust collecting electrode 130 is constructed with a body 131 as an insulator and a conductive nickel gold-plate film 132 covering the body.

Herein, the dust collecting electrode 130 can be formed as various shapes so as to have a dust collecting surface not only the internal surface 130a but also the both surfaces 130b.

For example, each dust collecting electrode 130 can be formed as a bar shape having a quadrangular section as depicted in FIGS. 8 and 9 or it can be formed as a bar shape having a H-section as depicted in FIG. 10.

In case of the dust collecting electrode 230 having the H-section, because twisting phenomenon frequently occurable in a mold process and a catapulting process performed in fabrication of the dust collecting electrode can be efficiently prevented, it can facilitate fabrication processes and form a wider dust collecting area, and accordingly dust collecting efficiency can be improved.

In the plasma air dust collector 100 in accordance with the present invention, a structure of the dust collecting electrode 130 is not only for changing a shape but also for improving dust collecting efficiency remarkably.

Figure 1:
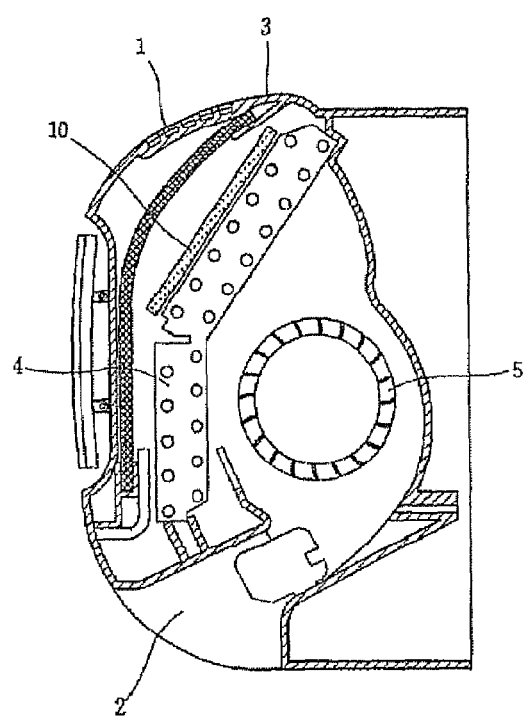
FIG. 1 is a longitudinal-sectional view illustrating an indoor unit of a general panel type air conditioner.
Figure 2:
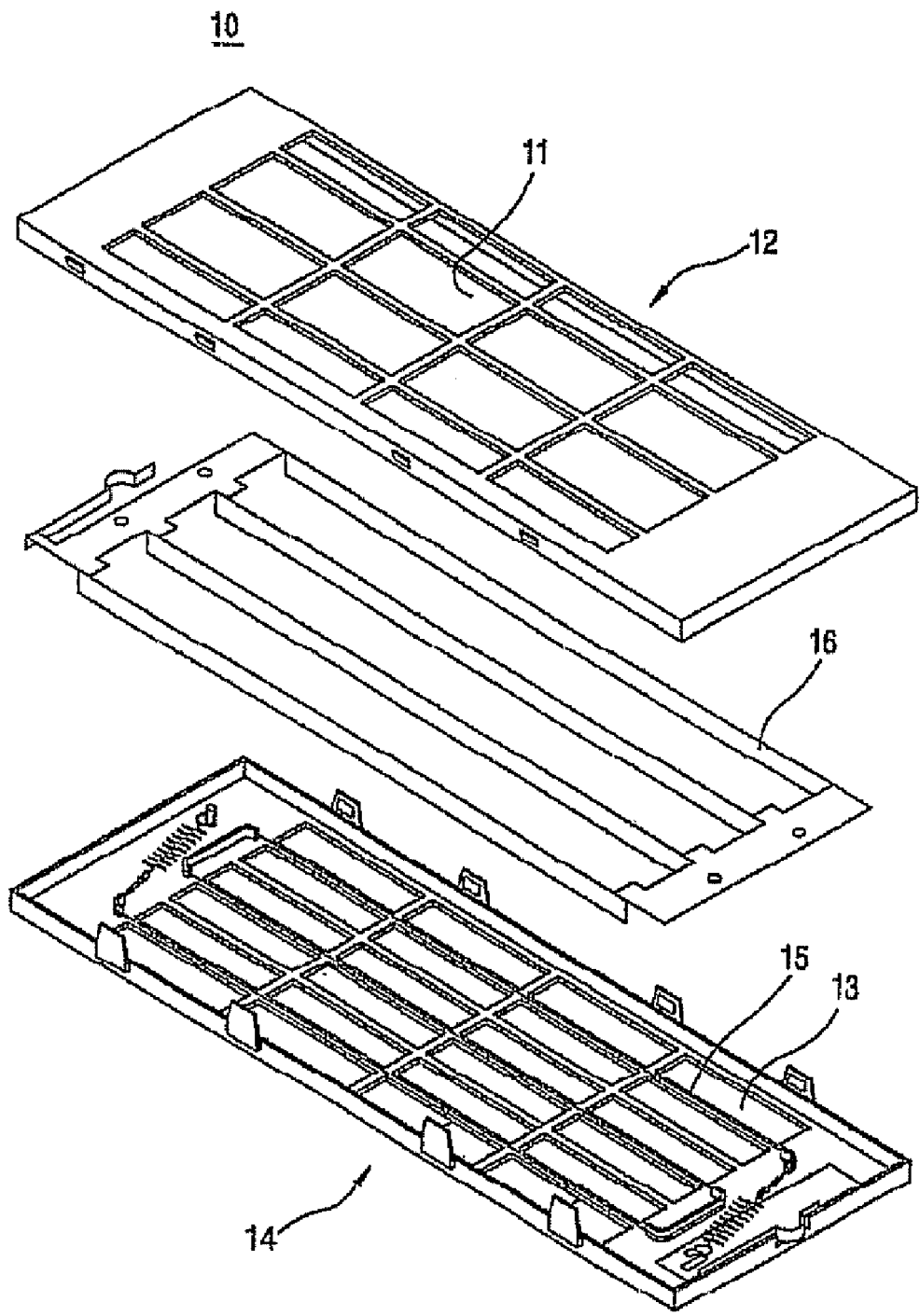
FIG. 2 is an exploded-perspective view illustrating the conventional plasma air dust collector.
Figure 3:
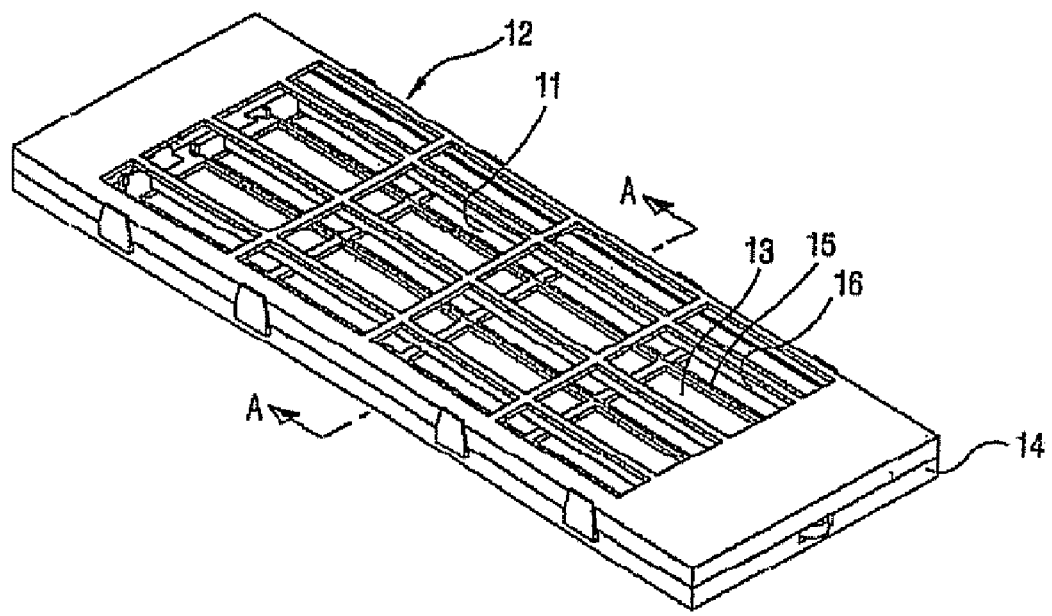
FIG. 3 is a combined-perspective view illustrating the conventional plasma air dust collector.
Figure 4:
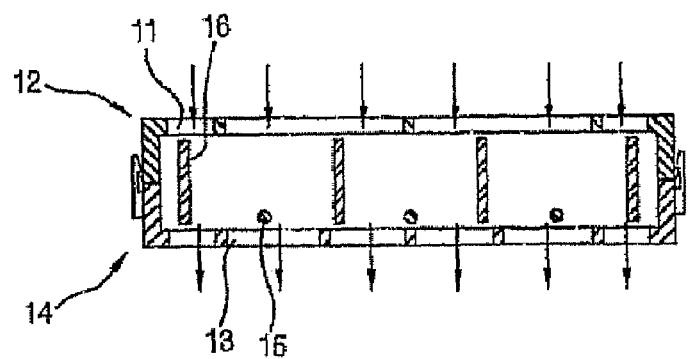
FIG. 4 is a sectional view taken along a line A—A in FIG. 3.
Figure 5:
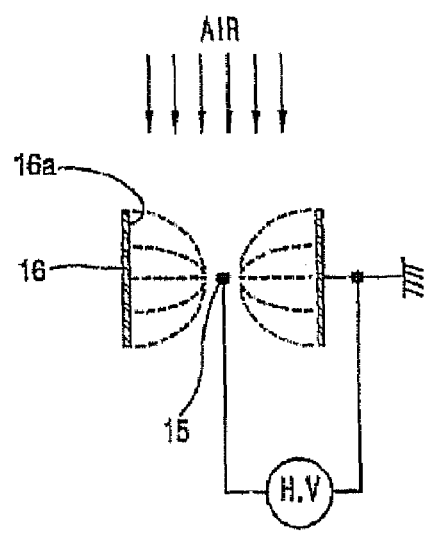
FIG. 5 illustrates discharge in the conventional plasma air dust collector.

In other words, in the conventional plasma air dust collector shown in FIG. 5, because the dust collecting electrode 16 is formed as a plate shape, a dust collecting surface is formed on only the internal surface 16a of the dust collecting electrode 16. However, in the plasma air dust collector 100 in accordance with the present invention, because a dust collecting is formed on not only the internal surface 130a opposed to the discharge electrode 140 but also the side surface 130b, the dust collecting surface is wider and accordingly dust collecting efficiency can be improved.

The discharge electrode 140 of the metal wire is supported by supporting portions 113 formed at the top surface of the first electrode fixing unit 110 and supporting portions 123 formed at the top surface of the second electrode fixing unit 120, and it is arranged in the length direction between the dust collecting electrodes 130.

Whenever a high voltage is applied, the end of the discharge electrode 140 is connected to the power terminal 111 of the dust collecting electrode 130, and the other end is connected to the power terminal 121 of the discharge electrode 140.

Each dust collecting electrode 130 can be connected to the first electrode fixing unit 110 and the second electrode fixing unit 120 as one body, however, it is more preferable to combine it detachably.

Hereinafter, with reference to FIG. 11, a construction of a dust collecting electrode combining means 150 for combining the end of the dust collecting electrode 130 with the first electrode fixing unit 110 detachably will be described.

In description of the dust collecting electrode combining means 150, because the first electrode fixing unit 110, the second electrode fixing unit 120 and the both ends of the dust collecting electrode 130 respectively combined thereto have the same shape, hereinafter, the first electrode fixing unit 110 and the end of the dust collecting electrode 130 combined with the first electrode fixing unit 110 will be described as an example.

The dust collecting combining means 150 is constructed with a terminal protrusion 151 formed at the bottom end of each dust collecting electrode 130 in the length direction so as to be connected to the dust collecting electrode power terminal 111; a terminal protrusion insertion hole 152 formed at a side of the first electrode fixing unit 110 so as to receive the terminal protrusion 151; a combining protrusion 153 formed at a side of the first electrode fixing unit 110; and a combining groove 154 formed at the both ends of each dust collecting electrode 130 so as to receive the combining protrusion 153.

Figure 12:
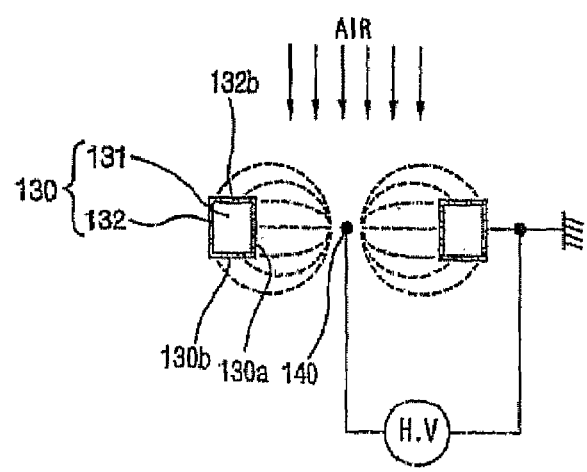
FIG. 12 illustrates discharge in the plasma air dust collector in accordance with the present invention.

Hereinafter, the operation of the plasma air dust collector in accordance with the present invention will be described with reference to accompanying FIG. 12.

When a high voltage is applied to each dust collecting electrode 130 and each discharge electrode 140 through the dust collecting power terminal 111 and the discharge electrode power terminal 121, discharge plasma occurs between each discharge electrode 140 and each dust collecting electrode 130. Herein, dust particles passing through between the dust collecting electrodes 130 are electrified by strong electric field and discharge plasma, the electrified dust particles are collected on each dust collecting electrode 130 by the Coulomb's law.

Herein, because each dust collecting electrode 130 is formed as a bar shape having a rectangular section, a dust collecting surface is formed on not only the internal surface 130a opposed to the discharge electrode 140 but also the side surface 130b, and accordingly dust collecting efficiency can be improved.

Figure 13:
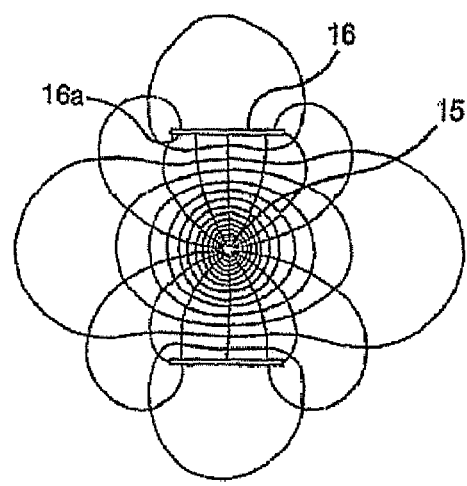
FIG. 13 illustrates simulation of electric force lines distribution of the conventional plasma air dust collector.
Figure 14:
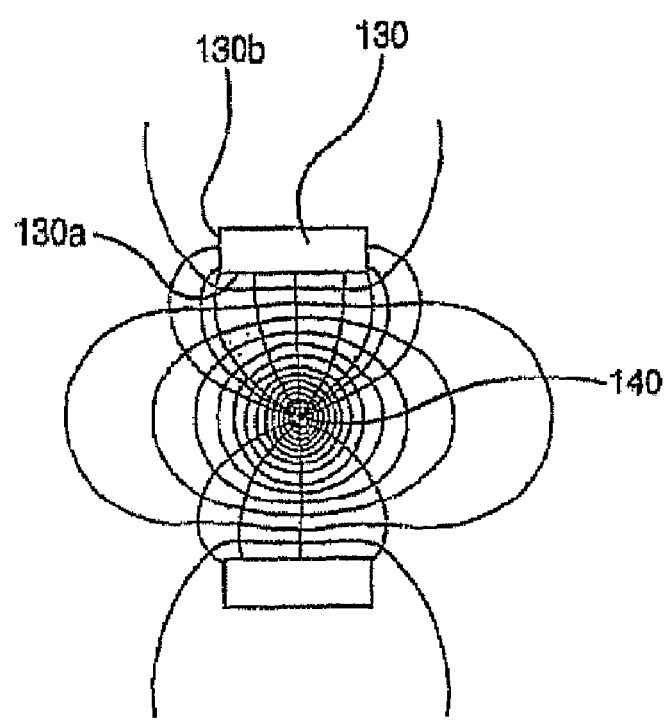
FIG. 14 illustrates simulation of electric force lines distribution of the plasma air dust collector in accordance with the present invention

FIG. 13 illustrates simulation of electric force lines distribution of the conventional plasma air dust collector, and FIG. 14 illustrates simulation of electric force lines distribution of the plasma air dust collector in accordance with the present invention.

First, as depicted in FIG. 13, in the conventional plasma air dust collector, an electric field line mainly exists on the internal surface 16a of the dust collecting electrode 16 corresponded to the discharge electrode 15, a dust collecting surface is small, and accordingly dust collecting efficiency can not be improved.

On the other hand, as depicted in FIG. 14, in the plasma air dust collector in accordance with the present invention, an electric field line exists on not only the internal surface 130a of the dust collecting electrode 130 but also the side surface 130b, a dust collecting surface can be increased, and accordingly dust collecting efficiency can be improved.

INDUSTRIAL APPLICABILITY

As described above, in the plasma air dust collector in accordance with the present invention, by eliminating a front casing and a rear casing for covering a discharge electrode and a dust collecting electrode, it is possible to implement a compact structure. In addition, by increasing a dust collecting surface of the dust collecting electrode, dust collecting efficiency can be improved.

The invention claimed is:

1. A plasma air dust collector, comprising:
   a first electrode fixing unit having a dust collecting electrode power terminal;
   a second electrode fixing unit arranged with a certain distance from the first electrode fixing unit to have a discharge electrode power terminal;
   at least two dust collecting electrodes as electric conductors installed between the first electrode fixing unit and the second electrode fixing unit in the length direction and connected to the dust collecting electrode power terminal in order to form an internal surface and a side surface thereof as dust collecting surfaces; and
   a discharge electrode as an electric conductor arranged between the dust collecting electrodes in the length direction and connected to the discharge electrode power terminal in order to apply a high voltage.

2. The plasma air dust collector of claim 1, wherein the first electrode fixing unit and the second electrode fixing unit are insulators.

3. The plasma air dust collector of claim 1, wherein each dust collecting electrode is connected to the first electrode fixing unit and the second electrode fixing unit as one body.

4. The plasma air dust collector of claim 3, wherein each dust collecting electrode is constructed with a body as an insulator and a conductive nickel gold-plate film covering the body.

5. The plasma air dust collector of claim 1, wherein each dust collecting electrode is formed as a bar shape having a rectangular section.

6. The plasma air dust collector of claim 1, wherein each dust collecting electrode is formed as a bar shape having a h-shaped section.

7. The plasma air dust collector of claim 1, wherein each dust collecting electrode is constructed with a body as an insulator and a conductive nickel gold-plate film covering the body.

8. A plasma air dust collector, comprising:
   a first electrode fixing unit having a dust collecting electrode power terminal;

a second electrode fixing unit arranged with a certain distance from the first electrode fixing unit to have a discharge electrode power terminal;

at least two dust collecting electrodes as electric conductors installed between the first electrode fixing unit and the second electrode fixing unit in the length direction and connected to the dust collecting electrode power terminal in order to form an internal surface and a side surface thereof as dust collecting surfaces;

a discharge electrode as an electric conductor arranged between the dust collecting electrodes in the length direction and connected to the discharge electrode power terminal to apply a high voltage; and a dust collecting electrode combining means for combining the both ends of each dust collecting electrode respectively with the first electrode fixing unit and the second electrode fixing unit detachably.

9. The plasma air dust collector of claim 8, wherein each dust collecting electrode is connected to the first electrode fixing unit and the second electrode fixing unit as one body.

10. The plasma air dust collector of claim 8, wherein each dust collecting electrode is constructed with a body as an insulator and a conductive nickel gold-plate film covering the body.

11. The plasma air dust collector of claim 8, wherein each dust collecting electrode is formed as a bar shape having a rectangular section.

12. The plasma air dust collector of claim 8, wherein each dust collecting electrode is formed as a bar shape having a h-shaped section.

13. The plasma air dust collector of claim 8, wherein each dust collecting electrode is constructed with a body as an insulator and a conductive nickel gold-plate film covering the body.

14. The plasma air dust collector of claim 8, wherein the dust collecting electrode combining means includes:

a terminal protrusion formed at the bottom end of each dust collecting electrode in the length direction so as to be connected to the dust collecting electrode power terminal;

a terminal protrusion insertion hole formed at a side of the first electrode fixing unit so as to receive the terminal protrusion;

a combining protrusion formed at a side of the first electrode fixing unit; and a combining groove formed at the both ends of each dust collecting electrode so as to receive the combining protrusion.

* * * * *